(12) United States Patent  
Srey et al.

(10) Patent No.: US 7,778,652 B2
(45) Date of Patent: Aug. 17, 2010

(54) METHOD AND APPARATUS FOR SELECTIVELY MODIFYING A PORTION OF A RADIO ACCESS NETWORK VIA A HOMELAND SECURITY ALERT SYSTEM

(75) Inventors: Lena Srey, Carpentersville, IL (US); John M. Harris, Chicago, IL (US); Antoine S. Iskandar, Etobicoke (CA); Steve L. Sheya, Vernon Hills, IL (US)

(73) Assignee: Motorola, Inc., Schaumburg, IL (US)

( * ) Notice: Subject to any disclaimer, the term of this patent is extended or adjusted under 35 U.S.C. 154(b) by 690 days.

(21) Appl. No.: 11/427,520

(22) Filed: Jun. 29, 2006

(65) Prior Publication Data

US 2008/0004045 A1 Jan. 3, 2008

(51) Int. Cl.
*H04B 1/38* (2006.01)

(52) U.S. Cl. .................. 455/458; 455/456.1; 455/41.2; 455/456.3; 455/456.4; 455/46

(58) Field of Classification Search ............. 455/456.4, 455/458, 435, 456.1, 456.2, 456.3, 41.2, 455/46

See application file for complete search history.

(56) References Cited

U.S. PATENT DOCUMENTS

| 5,912,950 | A | 6/1999 | Bubb |
| 6,081,731 | A | 6/2000 | Boltz et al. |
| 6,334,052 | B1* | 12/2001 | Nordstrand .................. 455/411 |
| 7,437,157 | B1* | 10/2008 | Satapathy ................. 455/435.1 |
| 2003/0014367 | A1* | 1/2003 | Tubinis ........................ 705/64 |
| 2003/0215078 | A1 | 11/2003 | Brahm et al. |
| 2005/0064922 | A1 | 3/2005 | Owens et al. |
| 2005/0130646 | A1* | 6/2005 | Frank et al. ............... 455/426.1 |
| 2005/0180338 | A1* | 8/2005 | Pirila et al. .................. 370/252 |
| 2006/0099968 | A1* | 5/2006 | Harris ...................... 455/456.4 |
| 2007/0032225 | A1* | 2/2007 | Konicek et al. ............. 455/417 |

\* cited by examiner

*Primary Examiner*—Vincent P Harper
*Assistant Examiner*—Fred A Casca (57) ABSTRACT

A system (100) includes a mobile station (125) to initiate an outgoing communication anywhere in a coverage area (115). A base station (110) and a radio access network (105) provide wireless service to the mobile station (125). The mobile station is paged in the sectors overlapping with only the clean zone. The mobile station (125) is paged in the sectors overlapping with the hot zone if the mobile station has predetermined trusted characteristics, or the mobile station is located within a clean zone of sectors overlapping with the hot zone, and an incoming communication for the mobile station originates from a predetermined trusted source. Existing calls to the mobile station are terminated in response to the existing call exceeding a predetermined threshold time limit, or a detected amount of voice activity in the existing call being below a predetermined threshold level.

23 Claims, 6 Drawing Sheets

METHOD AND APPARATUS FOR
SELECTIVELY MODIFYING A PORTION OF
A RADIO ACCESS NETWORK VIA A
HOMELAND SECURITY ALERT SYSTEM

TECHNICAL FIELD

This invention relates generally to a system for dynamically receiving information regarding hot zones from a Homeland Security alert system where wireless service is to be modified accordingly.

BACKGROUND

There are some types of terrorist bombs that can be set off to explode remotely by, e.g., calling a mobile station, such as a cellular telephone, to which the bomb is connected. For example, many bombs may be set to explode when an element of the mobile station is excited. Some bombs are set off when a call is made to the mobile station and a ringer of the mobile station makes an audible sound or vibrates. Other types of bombs can be triggered by an occurrence of certain audible noise during the middle of a call.

To prevent the possibility of a mobile station with a bomb from being remotely detonated, wireless service is currently selectively shut down to a geographical area in certain circumstances. For example, if there is a threat that terrorists may set off a bomb on a subway train platform, wireless service to the geographical area containing the subway train platform can be disabled. This, however, can cut off wireless service in adjacent areas. In the event that the subway train platform represents only a portion of the entire geographical area serviced by a base station for which service is disabled, mobile stations in the rest of the geographical area will also not be provided wireless service even though they are in an area that is not at a high risk of being attacked with a remotely detonated bomb.

Such remotely activated bombs are typically activated only upon receiving a call and having an element of a mobile station to which the bomb is connected vibrate. Accordingly, another problem with current systems is that they completely disable all wireless service so that a mobile station can neither contact nor be contacted by another wireless or hard-wired device. It is inefficient, however, to prevent a mobile station in the selected area from initiating a communication, because the bomb would be set off from an incoming communication, not an outgoing communication.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention.

DETAILED DESCRIPTION

Generally speaking, pursuant to these various embodiments, a system, method, and apparatus are provided for the selective modification of wireless service for a predetermined "hot zone," i.e., a geographical area selected as being at risk for terrorism such an area where a remotely detonated bomb may be located. The hot zone may be located within one or more sectors being provided with wireless service. The other portions of the wireless coverage area not contained within the hot zone may be known as "clean zones." The hot zone may also comprise some other type of geographical area for which it is desirable to shut down wireless service. The hot zone may include a subway platform, a government building, a sports stadium, an area where a high security person is located, such as the President of the United States, and so forth. The hot zone may either be predetermined or may be designated as a hot zone based on certain circumstances. For example, a federal building may comprise a predetermined hot zone, and certain subway stations may be designated as hot zones under certain circumstances such as when a specific threat has been made against subway stations by a terrorist.

A list of hot zones may be stored in a restricted access server. The identities of the hot zones may be specified by the Homeland Security Department, the Federal Bureau of Investigations ("FBI"), or certain police officers. For example, in the event that a threat is made against certain subway stations in New York City, the identities of those subway stations may be uploaded to the restricted access server. The restricted access server may, in turn, be in communication with a plurality of radio access networks providing wireless service to the geographical areas including the designated subway stations. The radio access networks may be instructed to restrict access to most mobile stations within a particular hot zone.

The radio access network may provide standard wireless service to the sectors of the wireless coverage area where the hot zone is not located. In the event that a federal building comprises the hot zone, the radio access network may, unlike current wireless systems, provide substantially the same wireless service to the sectors near, but not overlapping with, the hot zone that would normally be provided if the hot zone were not located nearby. Also, unlike current systems, wireless service may also be provided such that all mobile stations within the hot zone may initiate a communication such as, for example, calling another mobile station outside of the hot zone.

Incoming calls to certain mobile devices within the hot zone may be regulated. There are certain exceptions, however, which allow some mobile devices to receive the same wireless service as would be provided if not within the hot zone. For example, if the mobile device is a pre-determined "trusted" mobile station, standard wireless service may be provided. For example, police officers, firemen, or other select emergency workers may be provided with pre-approved mobile stations known to be trustworthy (i.e., not loaded with a bomb or other terrorism device). Calls originating from telephone numbers associated with a 911 operator, a police dispatcher, a fire department, and so forth, may be preset as being trustworthy and may also be allowed.

There may also be a next generation of mobile stations that are trustworthy. For example, there may be a type of mobile station that determines when it is in a hot zone and subsequently does not emit an audible ring or cause other excitations when called (e.g., it may not vibrate when called). For these types of mobile stations, the mobile station may "silently" ring for a longer time than it normally would and the user would have to notice that someone is attempting to call the mobile station by noticing a message shown on a display area for the mobile station. The user would then be able to engage in a conversation by pressing a special button on the mobile station and then answering the call in the standard manner.

When an incoming call is received by the radio access network intended for a mobile station within a wireless coverage area having a hot zone, the mobile station may be paged in the sectors that overlap only with clean zones. In other words, the mobile station may be paged in any of the sectors of the wireless coverage area in which a hot zone is not located. Moreover, in the sectors overlapping with the hot zone, the mobile station may be paged if the mobile station is a next-generation trustworthy mobile station, as discussed above, or if the call originates from a trustworthy source such as a police or 9-11 dispatcher. The mobile station may also be paged in the sectors overlapping with the hot zone if the radio access network has knowledge that the mobile station is located in a clean zone, i.e., not in the hot zone.

Another feature is that an existing call to a mobile station located in a hot zone may be gracefully terminated/dropped if the call exceeds a pre-set time limit or the level of voice activity in the call falls below a threshold level. The reason for the dropping of such calls is that both have characteristics of calls that could be used to initiate the detonation of a bomb.

Figure 1:
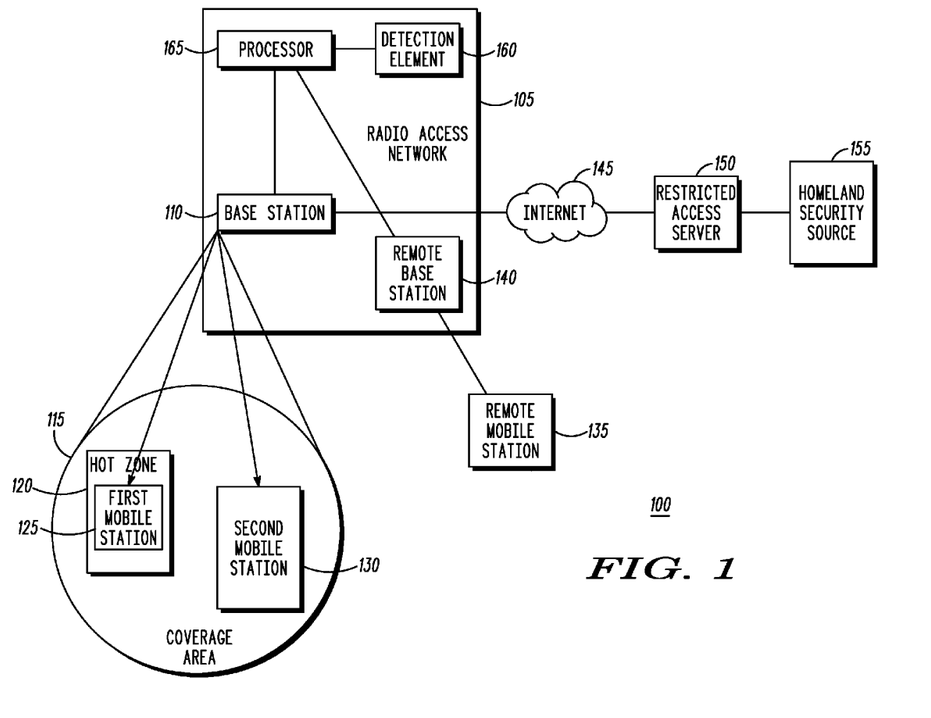
FIG. 1 illustrates a system according to at least one embodiment of the invention.

FIG. 1 illustrates a system 100 according to at least one embodiment of the invention. As shown, the system 100 includes a radio access network 105. The radio access network 105 includes or is in communication with at least one base station 110. The base station 110 provides wireless service to a coverage area 115. The coverage area 115 may include a hot zone, i.e., a designated geographical area for which wireless service is to be curtailed. As discussed above, the hot zone 120 may include a federal building, a sports park, a subway station, or any other geographical area likely to be a target of a remotely detonated bomb or other device of terrorism. The base station 110 may provide wireless service to a first mobile station 125 within the hot zone 120 and a second mobile station 130 located outside of the hot zone 120. The second mobile station 130 may, despite being in the same coverage area 115 as the hot zone 120, be provided with the same wireless service as would be provided if the coverage area 115 did not include the hot zone 120. In other words, there are no restrictions upon the incoming or outgoing calls that may be made by the second mobile station 130. In some embodiments, however, wireless service to the second mobile station 130 may be affected in the event that the second mobile station 130 is very close to the hot zone. The base station 110 may, however, modify the wireless service provided to the first mobile station 125 within the hot zone 120.

The wireless service provided in the hot zone 120 is modified to minimize the chances of a bomb being remotely detonated by some entity calling a mobile station rigged with explosives. That is, a vibration or other excitation occurring when its mobile station number is called could be used to detonate a mobile station rigged with explosives. Accordingly, incoming calls to mobile stations, such as the first mobile station 125, within the hot zone 120 are regulated. Outgoing calls from mobile stations, such as the first mobile station 125, within the hot zone 120 are not curtailed, however, because a bomb would likely be detonated from an incoming call, not an outgoing call.

Many incoming calls may not be allowed. In the event that a call is made to the first mobile station 125 from a remote mobile station 135 or hard-wired telephone, the call may go straight to a voicemail box for the first mobile station 125. A special message may also be played for a user of the remote mobile station 135 to indicate that the first mobile station 125 is within a hot zone 120. A user of the first mobile station 125 may also be notified when it is unable to receive voice calls through an automatic voicemail that is left for the user within the user's known voicemail system. This notification may be in addition to or instead of a text message sent to the first mobile station 125 to notify the user of the hot zone 120.

Additionally, the system 100 may block incoming instant messages, e-mails, call waiting, and other wireless services from the first mobile station 125. These services may also be blocked within an existing call. These services may be blocked from existing user data services because of the possibility that the first mobile station 125 or some other mobile station within the hot zone could include a wire device connected to a bomb where an incoming call to a wire device might explode the bomb.

Additionally, if a mobile page responds within a sector of the coverage area 115 which at least partially contains the hot zone 120, then the system 100 will query the first mobile station 125 (or use its directional antenna capability) to determine a more specific location of the first mobile station 125, before sending the first mobile station a message indicating that a telephone call has been received that is intended for the mobile station. This feature prevents the first mobile station 125 from ringing until the system 100 has established that the first mobile station 125 is not in the hot zone 120 within that sector.

In the event that the first mobile station 125 is a "trusted" mobile station, the system 100 would know that the first mobile station 125 will not raining or otherwise or when it receives a page. In this way the system 100 will have an opportunity to query the first mobile station 125 or otherwise determine its location more accurately before actually sending the instruction to the first mobile station 125 indicating that it should ring/alert.

The remote mobile station 135 may be in wireless communication with a remote base station 140 with the radio access network 105 or within some other radio access network. Alternatively, the remote mobile station 135 may instead be a hard-wired telephone.

There are exceptions, however, which allow some mobile devices to receive the same wireless service as would be provided if not within the hot zone 120. For example, if the mobile device is a pre-determined "trusted" mobile station, standard wireless service may be provided. Police officers, firemen, or other select emergency workers may be provided with pre-approved mobile stations known to be trustworthy (i.e., not loaded with a bomb or other terrorism device). Calls originating from telephone numbers associated with a 911 operator, a police dispatcher, a fire department, and so forth, may be preset as being trustworthy and may be allowed. A detection element 160 may detect whether the first mobile station 125 is a trusted mobile station based on prior knowledge of the first mobile station 125. A processor 165 may control operation of the detection element 160. Although the detection element 160 and processor 165 are shown as being separate from the base station 110 and the remote base station 140 in FIG. 1, it should be appreciated that each of the base station 110 and the remote base station 140 may include their own processor 165 and detection element 160.

There may also be a next generation of telephone that may be trustworthy, as discussed below with respect to FIG. 7. For example, there may be a new type of cellular telephone that determines when it is in a hot zone and subsequently does not emit an audible ring or cause other excitations when called (e.g., it may not vibrate when called). For these types of mobile stations, the mobile station may "silently" ring for longer time than it normally would and the user would have to notice that someone is attempting to call the mobile station by, e.g., noticing a message shown on a display area for the mobile station. The user would then be able to engage in a conversation by depressing a special button or typing in a code, for example, and then answering the call in the standard manner.

The base station 110 and the remote base station 140 may both be in communication with the Internet 145 or some other type of network such as a local area network ("LAN"). Via the Internet 145, the base station 110, the remote base station 140, and other entities in the radio access network 105 may be in communication with a restricted access server 150. The restricted access server 150 may contain a list of hot zones for which wireless access is to be limited. The list of hot zones may be uploaded onto the restricted access server 150 by a Homeland Security source 155 with the Homeland Security Department.

Additionally, the hot zone may specify the level of trust required. In some more extreme circumstances all incoming calls, even to tamper proof trusted mobiles or somewhat trusted subscribers e.g. this might be medical professionals, may be blocked. In other embodiments, incoming calls may be allowed to special mobiles which have been constructed such that they are much more difficult to connect them to a bomb.

Alternatively, a police department, fire department, or any other authorized source may upload or modify hot zone information on the restricted access server 150. The hot zone information may include some geographical areas that are permanent hot zones such as a subway station near the White House. The restricted access server 150 may also include some geographical areas that are only hot zones during certain times of the day such as during normal work hours, or on certain days of the week such as weekdays. The restricted access server 150 may also include geographical locations where certain high priority mobile stations or other devices are located. For example, if the Secret Service uses certain pre-designated mobile stations, a detection of the presence of at least one of these mobile stations within a certain geographical area will result in that geographical area being designated as a hot zone.

Figure 2:
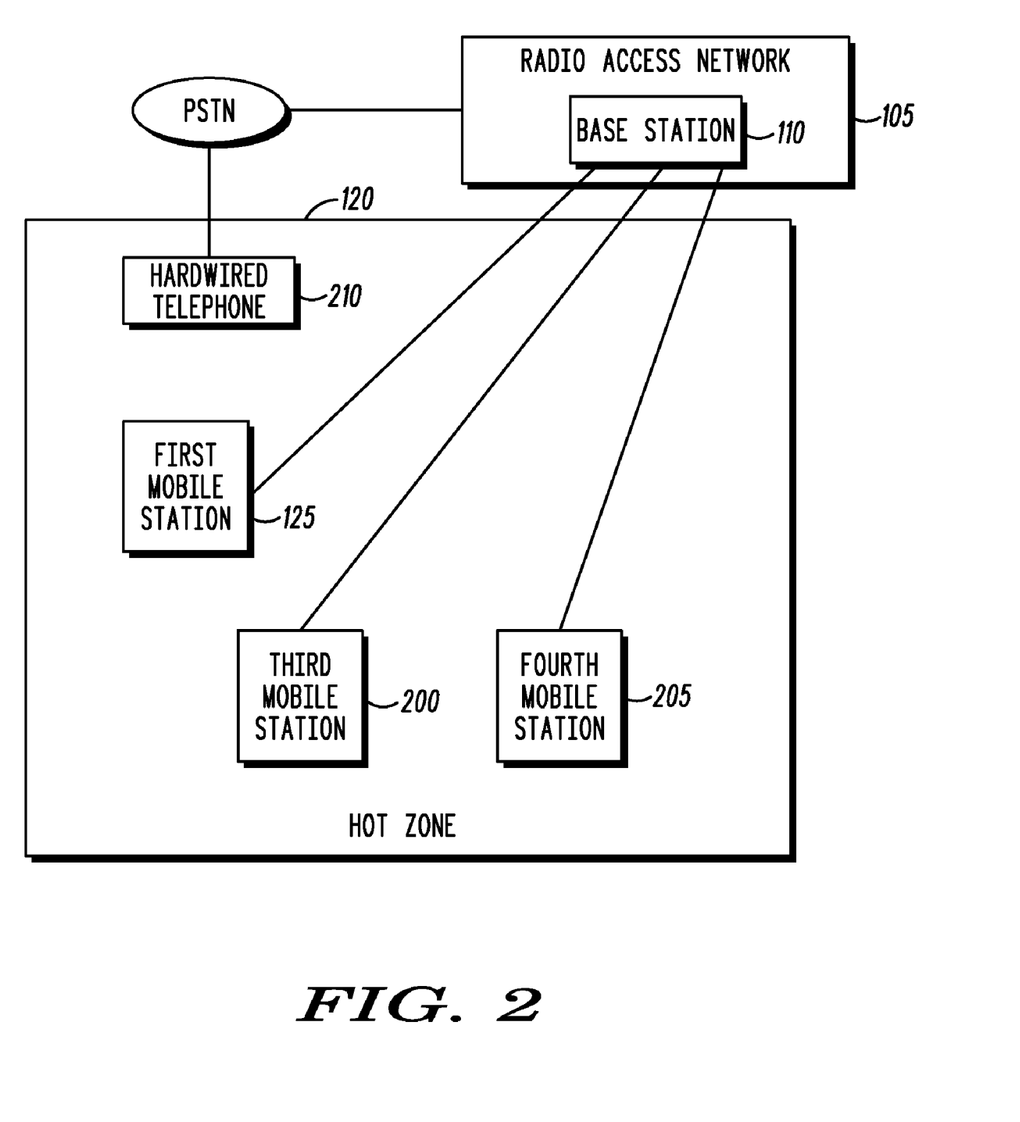
FIG. 2 illustrates a hot zone according to at least one embodiment of the invention.

FIG. 2 illustrates a hot zone 120 according to at least one embodiment of the invention. As shown, several mobile stations are located within the hot zone 120 such as the first mobile station 125, a third mobile station 200, and a fourth mobile station 205. Each of the first mobile station 125, the third mobile station 200, and the fourth mobile station 205 are in wireless communication with the base station 110 in the radio access network 105. As discussed above, each of the first mobile station 125, the third mobile station 200, and the fourth mobile station 205 may make a call to a mobile station or other communications device located outside of the hot zone 120. However, incoming calls are not allowed to any of these mobile stations unless the mobile stations have special safety features or the calls originate from a trusted source such as a 911 operator, a fired department dispatcher, or a police department dispatcher.

Several features may be applied to the mobile stations in the hot zone 120 to minimize the inconvenience of having restricted wireless access. For example, in the event that the first mobile station 125 has a pre-configured wireless account, the first mobile station 125 may have all incoming calls forwarded to a hard-wired telephone 210 within the hot zone 120. Alternatively, in the event that the hot zone 120 covers a federal building, a government worker may have incoming calls to the first mobile station 125 forwarded instead to the hard-wired telephone 210 in, for example, the user's office in the building.

Another feature that may be provided is an update to, e.g., the first mobile station's 125 standard voicemail greeting. That is, the first mobile station's 125 voicemail greeting may be modified when the first mobile station 125 is located within the hot zone 120. The voicemail greeting may be modified to indicate that the call cannot be completed because the user of the first mobile station 125 is located within a hot zone 120. Alternatively, the voicemail greeting may also indicate the area where the first mobile station is currently located (e.g., "the 5th street subway station"). In some embodiments the exact location is not provided due to safety concerns. The outgoing message may additionally offer the caller the opportunity to suggest a time or to indicate its availability to participate in a conference call in the future. In other words, the caller may be asked whether the caller will be available for a conference call any time during the next hour.

An additional service that may be provided to mobile stations within the hot zone 120 is a conference bridge service whereby the first mobile station 125 may be placed in communication with at least one other mobile station in the hot zone 120 for text messaging and/or data scheduling. The first mobile station 125 may therefore send a text message to the third mobile station 200 to inform a user of the third mobile station 200 that they are within a hot zone 120 and are unable to receive calls from communication devices outside of the hot zone 120. Additionally, when the user does initiate a connection to the system while in the hot zone, the user will receive all queued text messages and other notifications such that the user can respond/confirm future conference bridge communications.

Figure 3:
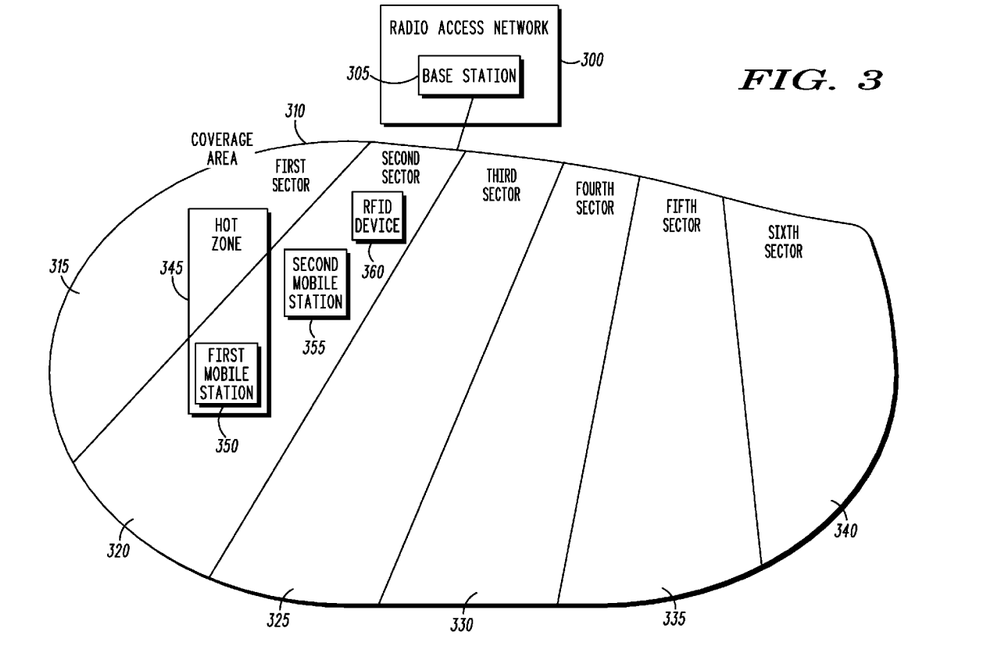
FIG. 3 illustrates a radio access network and base station providing wireless service to a coverage area comprising a plurality of sectors according to at least one embodiment of the invention.

FIG. 3 illustrates a radio access network 300 and base station 305 providing wireless service to a coverage area 310 comprising a plurality of sectors according to at least one embodiment of the invention. As shown, the coverage area 310 includes a first sector 315, a second sector 320, a third sector 325, a fourth sector 330, a fifth sector 335, and a sixth sector 340. The coverage area 310 may include more or fewer than six sectors. Six sectors are shown for the sake of simplicity.

A hot zone 345 is located within the first sector 315 and the second sector 320. Both a first mobile station 350 and a second mobile station 355 are located entirely within the second sector 320, however, the first mobile station 350 is located in the hot zone 345 while the second mobile station 355 is not. As discussed above with respect to FIGS. 1 and 2, mobile stations anywhere within a coverage area can initiate an outgoing call. Accordingly, both the first mobile station 350 and the second mobile station 355 may initiate outgoing calls.

In the event that an incoming call is made to the first mobile station 350, the third sector 325, the fourth sector 330, the fifth sector 335, and the sixth sector 340 may be paged because the radio access network 300 has knowledge that these sectors are each clean sectors, i.e., lacking the hot zone 345. If the incoming call is originating from a trusted source such as a 911 or police dispatcher, the first sector 315 and the second sector 320 are also paged. If the first mobile station 350 is known to be a predetermined emergency mobile station or a special next generation safety-compliant mobile station, the first sector 315 and the second sector 320 will also be paged. An RFID device 360 may be used to detect the location of the first mobile station 350. The RFID device 360 may be contained within a building such that movement of the first mobile station 350 into the building is detected and the location of the first mobile station 350 is therefore determined. Although FIG. 3 is described as having one hot zone 345, it should be appreciated that more than one hot zone may be included within the coverage area 310.

Figure 4:
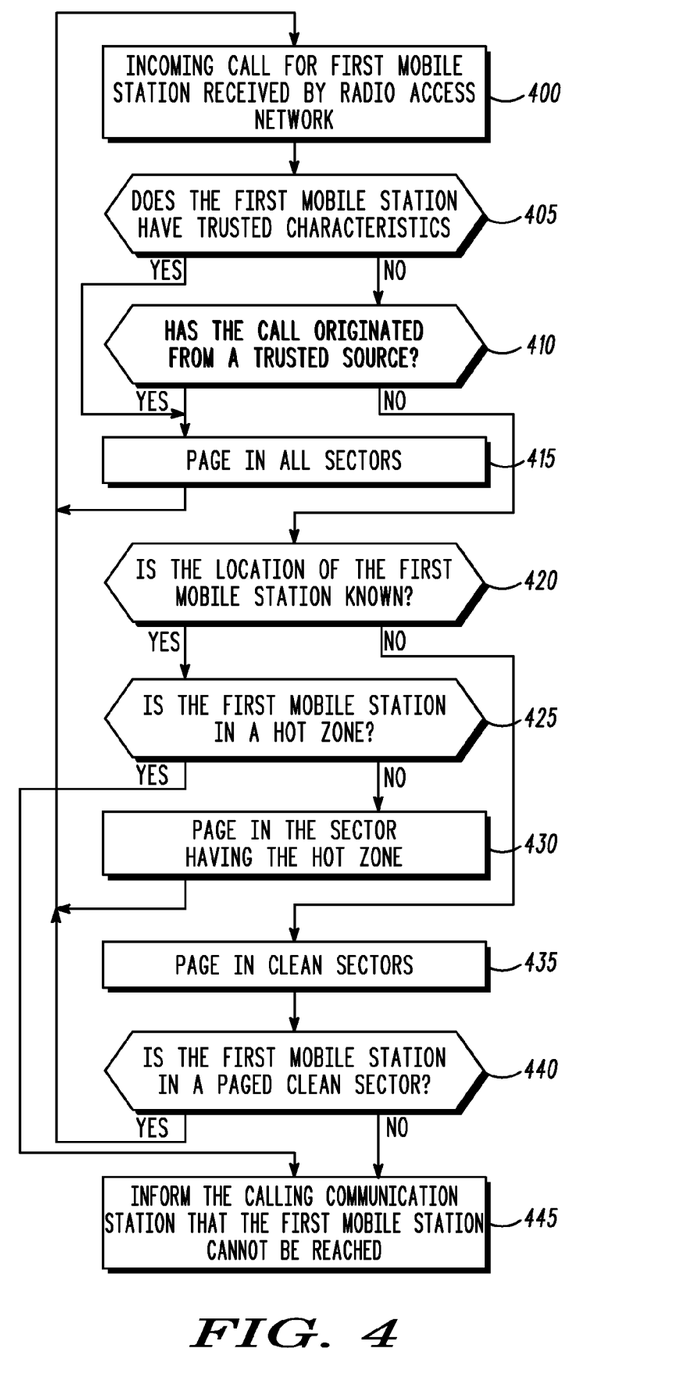
FIG. 4 illustrates a method of paging for the first mobile station when an incoming call is received, as described above with respect to FIG. 3 according to at least one embodiment of the invention.

FIG. 4 illustrates a method of paging for the first mobile station 350 when an incoming call is received, as described above with respect to FIG. 3 according to at least one embodiment of the invention. First, at operation 400, an incoming call for the first mobile station 350 is received by the radio access network 300. Next, at operation 405, a determination is made as to whether the first mobile station 350 has trusted characteristics. If "yes" at operation 405, processing proceeds to operation 415. At operation 415, all sectors are paged and processing then returns to operation 400. If "no" at operation 405, processing proceeds to operation 410 where a determination is made as to whether the incoming call originates from a trusted source. If "yes" at operation 410, then processing proceeds to operation 415 and all sectors are paged and then processing returns to operation 400. If "no" at operation 410, processing proceeds to operation 420 where a determination is made as to whether the location of the first mobile station 350 is known. If "yes" at operation 420, processing proceeds to operation 425. If "no" at operation 420, processing proceeds to operation 435. At operation 425, a determination is made as to whether the first mobile station 350 is located within a hot zone 345. If "yes," processing proceeds to operation 445. If "no," processing proceeds to operation 430 where the sector having the hot zone 345 is paged and processing then returns to operation 400. At operation 435, all of the clean sectors are paged. Next, at operation 440, a determination is made as to whether the first mobile station 350 is in one of the paged clean sectors. If "yes," processing returns to operation 400. If "no," the calling communications station originating the call is informed that the first mobile station 350 cannot be reached at operation 445 and may also be informed that the first mobile station 350 is within a hot zone 345.

Another feature is that an existing call to a mobile station located in a hot zone may be gracefully terminated/dropped if the call exceeds a pre-set time limit or the level of voice activity in the call falls below a threshold level. The reason for the dropping of such calls is that both have characteristics of calls that could be used to initiate the detonation of a bomb.

Figure 5:
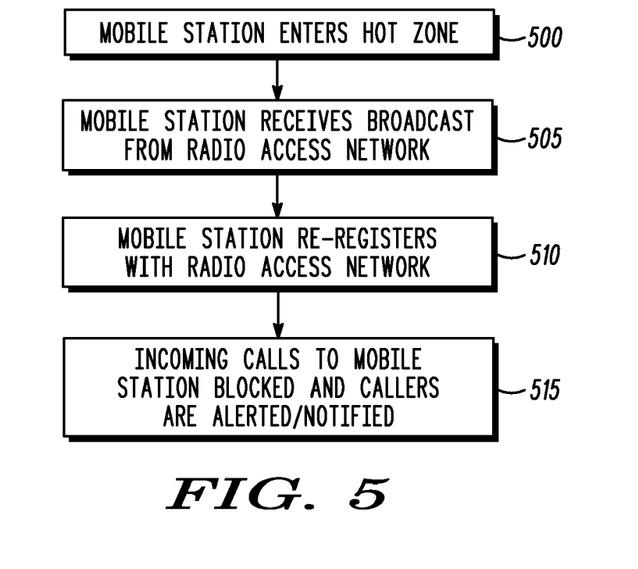
FIG. 5 illustrates a method of restricting wireless access to mobile station entering a hot zone according to at least one embodiment of the invention.

FIG. 5 illustrates a method of restricting wireless access to a mobile station in a hot zone according to at least one embodiment of the invention. First, at operation 500, the mobile station enters into a hot zone. Next, at operation 505, the mobile station receives a broadcast from the radio access network indicating that the mobile station is within a hot zone. The mobile station subsequently re-registers with the radio access network at operation 510. Finally, incoming calls to the mobile station are blocked and callers are altered/notified that the mobile station is within a hot zone at operation 515.

Figure 6:
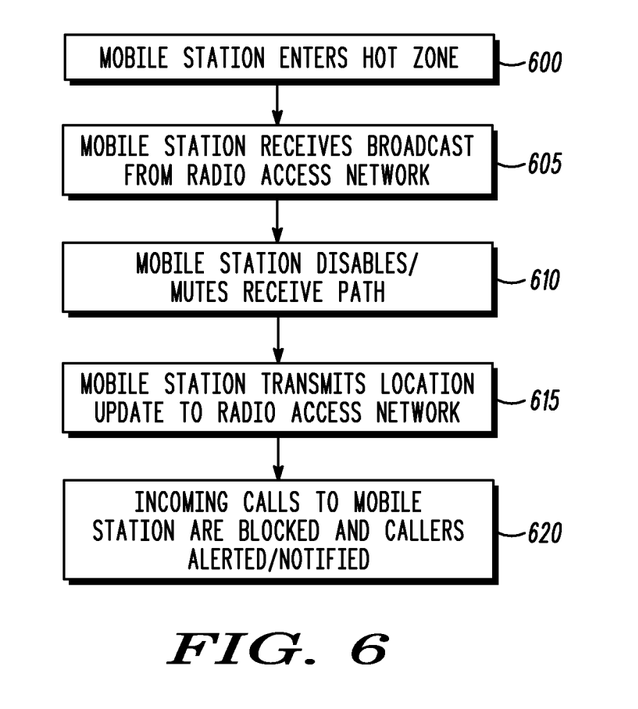
FIG. 6 illustrates a method of restricting wireless access to a mobile station entering a hot zone according to at least one embodiment of the invention.

FIG. 6 illustrates a method of restricting wireless access to a mobile station in a hot zone according to at least one embodiment of the invention. The method of FIG. 6 differs from the method shown in FIG. 5 in that, e.g. the mobile station performs its own self-muting when within the hot zone. First, at operation 600, the mobile station enters into a hot zone. Next, at operation 605, the mobile station receives a broadcast from the radio access network indicating that the mobile station is within the hot zone. The mobile station subsequently disables/mutes its receive path at operation 610. The mobile station then transmits an update of its location to the radio access network at operation 615. Finally, incoming calls to the mobile station are blocked and callers are altered/notified that the mobile station is within a hot zone at operation 620.

Figure 7:
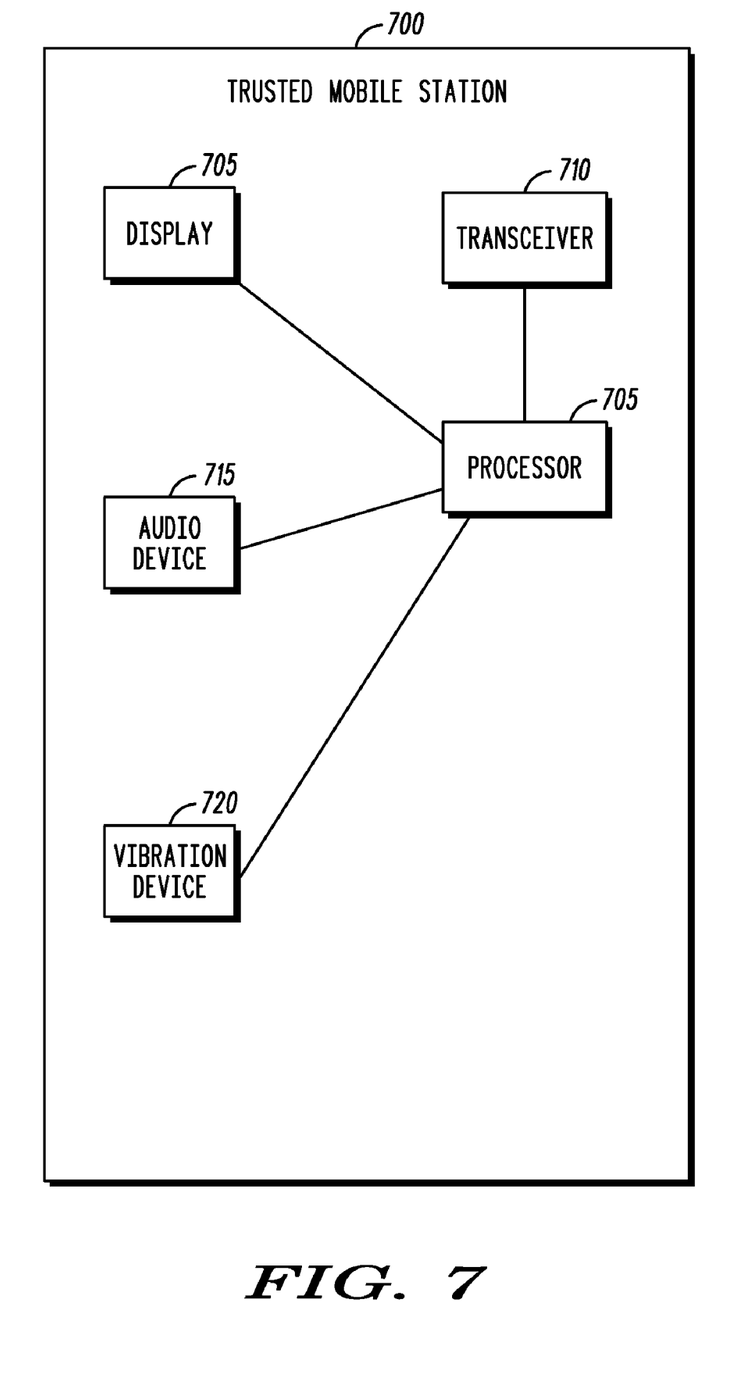
FIG. 7 illustrates a trusted mobile station according to at least one embodiment of the invention.

FIG. 7 illustrates a trusted mobile station 700 according to at least one embodiment of the invention. As previously discussed above, certain trusted mobile stations 700 may be configured to both receive and initiate calls while within a hot zone and perform the same functions as are normally provided outside of the hot zone. These trusted mobile stations 700 may include a processor 705 to modify the receiving of a call while within the hot zone. The trusted mobile station 700 may include a display 705, a transceiver 710, an audio device 715, and a vibration device 720. The processor 705 may disable the audio device 715 and the vibration device 720 while within the hot zone so that the trusted mobile station 700 does not audibly ring or vibrate when a call is received by the transceiver 710. The processor 705 is also in communication with a display 705 which may be utilized to indicate that a call is being made to the trusted mobile station 700. Because the trusted mobile station 700 does not audibly ring or vibrate when in the hot zone, it instead "silently rings" by, for example, displaying certain information on the display 705 such as the identity of the caller. Because the "ringing" is silent, then trusted mobile station 700 may be allowed to ring for a longer than usual amount of time before a caller placing a call to the trusted mobile station is directed to the voicemail box for the trusted mobile station 700.

The trusted mobile station 700 may be answered while in the hot zone in the same way that the trusted mobile station 700 is answered while outside of the hot zone. In other embodiments, the user must press an additional button or other element to answer a call made to the trusted mobile station 700 while within the hot zone. By requiring the user to press a button, this avoids the case where the trusted mobile station 700 does not ring when it receives a call, but is configured to automatically answer any incoming voice calls. In this case, a terrorist might connect a bomb to be triggered when a speakerphone plays out loud an audio message received across the voice path. For this reason, an automatic answer mode may potentially be disabled on all trusted mobile stations 700 within the hot zone.

According to at least one embodiment of the invention, a method is provided for permitting an outgoing communication from a first mobile station in response to (a) the first mobile station being located in a hot zone of a wireless coverage area, and (b) in response to the first mobile station being located in a clean zone of a wireless coverage area. The wireless coverage area is comprised of a plurality of sectors. Also, at least one of the following four operations may be performed. The first operation that may be performed is paging for the first mobile station in the sectors overlapping with only the clean zone. The second operation that may be performed is paging for the first mobile station in the sectors overlapping with the hot zone in response to the first mobile station having a non-alert feature in response to a page. The third operation that may be performed is paging for the first mobile station in the sectors overlapping with the hot zone in response to determining at least one of: (a) the first mobile station has predetermined trusted characteristics, (b) the first mobile station is located within a clean zone of the sectors overlapping with the hot zone, and (c) an incoming communication for the first mobile station originates from a predetermined trusted source. The fourth operation that may be performed is terminating an existing call to the first mobile station in response to at least one of the existing call exceeding a predetermined threshold time limit and a detected amount of voice activity in the existing call being below a predetermined threshold level.

The predetermined trusted source may comprise a communication device associated with at least one of a trusted telephone number and an emergency phone number. The predetermined trusted characteristics may comprise at least one of emergency mobile station characteristics and predetermined public safety compliant features. The predetermined public safety compliant features may comprise at least one of a silent ring feature in response to the second communication being initiated with the first mobile station, a physical movement requirement feature where a user of the first mobile station is required to physically move an element on the first mobile station to receive the incoming communication, and a non-alert feature in response to a page.

The hot zone may be remotely selected. The hot zone may include at least one of a subway with a wireless communications base station and a building with a pico-cell wireless communications base station. A designation of the hot zone may be dynamically configured based on a presence of at least one specific sensitive subscriber in the sectors.

The incoming communication for a mobile station may be blocked in response to detecting an absence of one or more of: (a) the mobile station having the predetermined trusted characteristics, (b) the mobile station being located within the clean zone of the sectors overlapping with the hot zone, and (c) the incoming communication for the mobile station originating from a predetermined trusted source. An RFID device may be used to detect a location of the mobile station In response to the incoming communication being blocked, a source of the incoming communication may be alerted of the unavailability of the mobile station. The incoming communication may also be forwarded to a designated alternative communications device such as, for example, a hard-wired telephone. A conference bridge service may also be provided between the mobile station and another mobile station in the hot zone.

A system is further provided according to at least one embodiment of the invention. A mobile station initiates an outgoing communication while located within at least one of a hot zone and a clean zone of a wireless coverage area. The wireless coverage area is comprised of a plurality of sectors.

A base station and a radio access network provide wireless service to the mobile station. The base station and radio access network perform at least one of the following four operations. The first operation that may be performed is paging for the mobile station in the sectors overlapping with only the clean zone. The second operation that may be performed is paging for the mobile station in the sectors overlapping with the hot zone in response to the mobile station having a non-alert feature in response to a page. The third operation that may be performed is paging for the mobile station in the sectors overlapping with the hot zone in response to determining at least one of: (a) the mobile station has predetermined trusted characteristics, (b) the mobile station is located within a clean zone of the sectors overlapping with the hot zone, and (c) an incoming communication for the mobile station originates from a predetermined trusted source. The fourth operation that may be performed is terminating an existing call to the mobile station in response to at least one of the existing call exceeding a predetermined threshold time limit and a detected amount of voice activity in the existing call being below a predetermined threshold level.

The system may also include a server to store a location of the predetermined hot zone of the wireless coverage area. The predetermined trusted source comprises a communication device associated with at least one of a trusted telephone number and an emergency phone number. The predetermined trusted characteristics comprise public safety compliant features that may include at least one of (a) a silent ring feature in response to a communication being initiated with the mobile station, and (b) a physical movement requirement feature wherein a user of the mobile station is required to physically move an element on the mobile station to receive the incoming communication, non-alert feature in response to a page.

The predetermined hot zone may comprise at least one of a subway with a wireless communications base station and a building with a pico-cell wireless communications base station. The system may also include a radio frequency identification (RFID) device to detect a location of the mobile station The various embodiments described above provide many benefits over current systems. For example, the integration of security awareness between the public, Homeland Security, and local or state agencies is provided. Also, commuters and others may be allowed to report any suspicious activity and aid in the security process by using their mobile phones to keep government agencies aware. Moreover, "safe" mobile-to-mobile calls with a hot zone are allowed.

Another benefit is that no external hardware is required for carrier jamming. There is also no need for public safety officials to keep moving and/or attenuating the power of external jammers currently used for better coverage. The system provided is secure and versatile. An additional benefit is the seamless integration of mobile stations, networks, and public safety devices.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method, comprising:
    dynamically determining whether circumstances exist for blocking calls into a hot zone;
    determining at least one hot zone where the calls should be blocked; and in response to determining that circumstances exist for blocking calls into the hot zone, selectively blocking calls to mobile stations located in the hot zone while permitting outgoing communications from the mobile stations, wherein selectively blocking calls to the mobile stations comprises paging for a mobile station in response to determining that the mobile station has a non-alert feature in response to a page activated.

2. The method of claim 1, further comprising alerting the mobile stations located in the hot zone of their presence in the hot zone.

3. The method of claim 1, further comprising terminating an existing call to a mobile station in response to a detected level of voice activity in the existing call being below a predetermined threshold.

4. The method of claim 1, wherein the hot zone comprises at least one of a subway with a wireless communications base station and a building with a pico-cell wireless communications base station.

5. The method of claim 1, further comprising using a radio frequency identification (RFID) device to detect a location of each of the mobile stations.

6. The method of claim 1, further comprising dynamically configuring a designation of the hot zone based on a presence of at least one specific sensitive subscriber in the sectors.

7. The method of claim 1, further comprising:
paging for the mobile station in sectors overlapping with the hot zone in response to determining at least one of: the mobile station has predetermined trusted characteristics, the mobile station is located within a clean zone of the sectors overlapping with the hot zone, and an incoming communication for the mobile station originates from a predetermined trusted source.

8. The method of claim 7, wherein the predetermined trusted source comprises a communication device associated with at least one of a trusted telephone number and an emergency phone number.

9. The method of claim 7, wherein the predetermined trusted characteristics comprise one or more of emergency mobile station characteristics and predetermined public safety compliant features, the predetermined public safety compliant features comprising at least one of a silent ring feature in response to the second communication being initiated with the mobile station, a physical movement requirement feature wherein a user of the mobile station is required to physically move an element on the mobile station to receive the incoming communication, and a non-alert feature in response to a page.

10. The method of claim 7, further comprising blocking the incoming communication in response to detecting an absence of: one or more of the mobile stations having the predetermined trusted characteristics, the mobile station being located within the clean zone of the sectors overlapping with the hot zone, and the incoming communication for the mobile station originating from the predetermined trusted source.

11. The method of claim 7, further comprising, in response to the incoming communication being blocked, alerting a source of the incoming communication of an unavailability of the mobile station, forwarding the incoming communication to a designated alternative communications device, and providing a conference bridge service between the mobile station and another mobile station in the hot zone.

12. A system, comprising:
an authorized source to dynamically determine whether circumstances exist for blocking calls into a hot zone and to determine at least one hot zone where the calls should be blocked;
a base station and a radio access network in response to the authorized source determining that circumstances exist for blocking calls into the hot zone, selectively blocking calls to mobile stations located in the hot zone while permitting outgoing communications from the mobile stations, wherein selectively blocking calls to the mobile stations comprises paging for a mobile station in response to the mobile station having a non-alert feature in response to a page activated.

13. The system of claim 12, further wherein the base station and radio access network further terminate an existing call to a mobile station in response to a detected level of voice activity in the existing call being below a predetermined threshold.

14. The system of claim 12, wherein the hot zone comprises at least one of a subway with a wireless communications base station and a building with a pico-cell wireless communications base station.

15. The system of claim 12, further comprising a radio frequency identification (RFID) device to detect a location of each of the mobile stations.

16. The system of claim 12, wherein the base station and radio access network further performs:
paging for the mobile station in sectors overlapping with the hot zone in response to determining at least one of: the mobile station has predetermined trusted characteristics, the mobile station is located within a clean zone of the sectors overlapping with the hot zone, and an incoming communication for the mobile station originates from a predetermined trusted source.

17. The system of claim 16, wherein the predetermined trusted source comprises a communication device associated with at least one of a trusted telephone number and an emergency phone number.

18. The system of claim 16, wherein the predetermined trusted characteristics comprise public safety compliant features comprising one or more of a silent ring feature in response to the second communication being initiated with the mobile station, a physical movement requirement feature wherein a user of the mobile station is required to physically move an element on the mobile station to receive the incoming communication, and the non-alert feature in response to a page.

19. The system of claim 16, wherein the base station and radio access network blocks the incoming communication in response to detecting an absence of: one or more of the mobile station having the predetermined trusted characteristics, the mobile station being located within the clean zone of the sectors overlapping with the hot zone, and the incoming communication for the mobile station originating from the predetermined trusted source.

20. A base station, comprising:
a first communication device in communication with an authorized source to dynamically determine whether circumstances exist for blocking calls into a hot zone and to determine at least one hot zone where the calls should be blocked; and
a processing device in response to the authorized source determining that circumstances exist for blocking calls into the hot zone, to instruct the first communication device to selectively block calls to mobile stations located in the hot zone while permitting outgoing communications from the mobile stations, wherein selectively blocking calls to the mobile stations comprises paging for a mobile station in response to determining that the mobile station has a non-alert feature in response to a page activated.

21. The base station of claim 20, wherein the processing device is adapted to determine whether the mobile station is one or more of a trusted mobile station and an emergency mobile station.

22. The base station of claim 20, wherein the processing device further terminates an existing call to a mobile station in response to a detected level of voice activity in the existing call being below a predetermined threshold.

23. The base station of claim 20, wherein the processing device further performs:

paging for the mobile station in sectors overlapping with the hot zone in response to determining at least one of: the mobile station has predetermined trusted characteristics, the mobile station is located within a clean zone of the sectors overlapping with the hot zone, and an incoming communication for the mobile station originates from a predetermined trusted source.

* * * * *